US007599497B2

(12) United States Patent
Soppera

(10) Patent No.: US 7,599,497 B2
(45) Date of Patent: Oct. 6, 2009

(54) KEY MANAGEMENT PROTOCOL

(75) Inventor: Andrea Soppera, Ipswich (GB)

(73) Assignee: British Telecommunications public limited company, London (GB)

( * ) Notice: Subject to any disclaimer, the term of this patent is extended or adjusted under 35 U.S.C. 154(b) by 482 days.

(21) Appl. No.: 10/507,114

(22) PCT Filed: Mar. 14, 2003

(86) PCT No.: PCT/GB03/01096

§ 371 (c)(1),
(2), (4) Date: Sep. 10, 2004

(87) PCT Pub. No.: WO03/084166

PCT Pub. Date: Oct. 9, 2003

(65) Prior Publication Data

US 2005/0271210 A1 Dec. 8, 2005

(30) Foreign Application Priority Data

Mar. 27, 2002 (EP) .................................. 02252215
Mar. 27, 2002 (EP) .................................. 02252217

(51) Int. Cl.
*H04L 9/08* (2006.01)
(52) U.S. Cl. ..................................... 380/279
(58) Field of Classification Search ................. 380/279
See application file for complete search history.

(56) References Cited

U.S. PATENT DOCUMENTS 5,146,497 A * 9/1992 Bright ......................... 380/273

| 6,049,878 A | 4/2000 | Caronni et al. |
| 6,240,188 B1 * | 5/2001 | Dondeti et al. ............. 380/284 |
| 7,095,850 B1 * | 8/2006 | McGrew ..................... 380/42 |

(Continued)

FOREIGN PATENT DOCUMENTS

WO    WO 01/03365 A1    1/2001

OTHER PUBLICATIONS

Perrig et al., "Elk, New Protocol for Efficient Large-Group Key Distribution", Proceedings of the 2001 IEEE Symposium on Security and Provacy, S&P 2001, Oakland, CA, May 14-16, 2001, pp. 247-262.

(Continued)

*Primary Examiner*—Christian LaForgia
(74) *Attorney, Agent, or Firm*—Nixon & Vanderhye PC

(57) ABSTRACT

A key distribution server maintains a tree of nodes. Members of a group who are allowed access to information are associated with respective leaf nodes of the tree. The information is encrypted with a key comprising a join key field and a leave field, and these are associated with the root node of the tree. The join key is updated each time a member joins the group and the leave field is updated each time a member leaves. Further respective leave keys are associated with the other nodes of the tree. The leave keys of the tree are related so that a member knowing the leave key of its node can work out the leave key of the root node and hence decrypt the information. The key distribution server transmits offset messages to the members to allow them so to calculate the root node leave key. The system of offset messages reduces the amount of communication required between the key distribution server and the group members.

44 Claims, 9 Drawing Sheets

U.S. PATENT DOCUMENTS

| | | | |
|---|---|---|---|
| 7,103,185 B1 * | 9/2006 | Srivastava et al. | 380/277 |
| 7,131,010 B2 * | 10/2006 | Okaue et al. | 713/189 |
| 2003/0044017 A1 * | 3/2003 | Briscoe | 380/277 |

OTHER PUBLICATIONS

Rafaeli et al., "EHBT: An Efficient Protocol for Group Key Management", Proceedings of NGC'01:Networked Group Communication 2001, London, UK, Nov. 7-9, 2001, pp. 159-171.

Kim et al., "Simple and Fault-Tolerant Key Agreements for Dynamic Collaborative Groups", Proceedings of the 7$^{th}$ ACM Conference on Computers and Communications Security, Athens, Greece, No. 1-4, 2000, pp. 235-244.

Canetti et al., "Multicast Security: A Taxonomy and Some Efficient Constructions", In Proc. IEEE Infocom 99, 1999.

Wallner et al., "Key Management for Multicast:Issues and Architecture", Request for Comment RFC 2627 of Internet Engineering Task Force, Jun. 1999.

Balenson et al., "Key Management for Large Dynamic Groups: One-Way Function Trees, and Amortized Initialization", Internet Draft of Internet Engineering Task Force, Feb. 26, 1999.

Rivest, "The MD5 Message Digest Algorithm", Request for Comment RFC 1321 of Internet Engineering Task Force, Apr. 1992.

\* cited by examiner

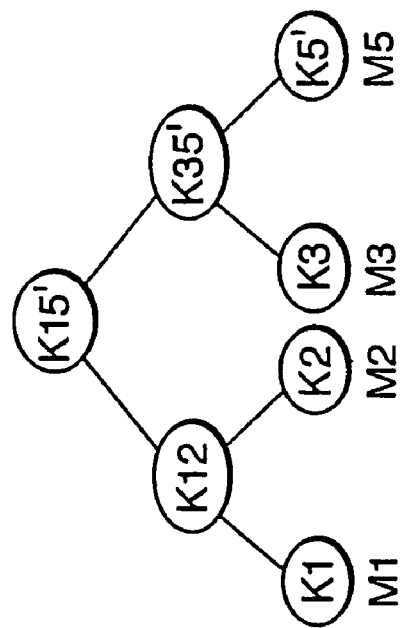
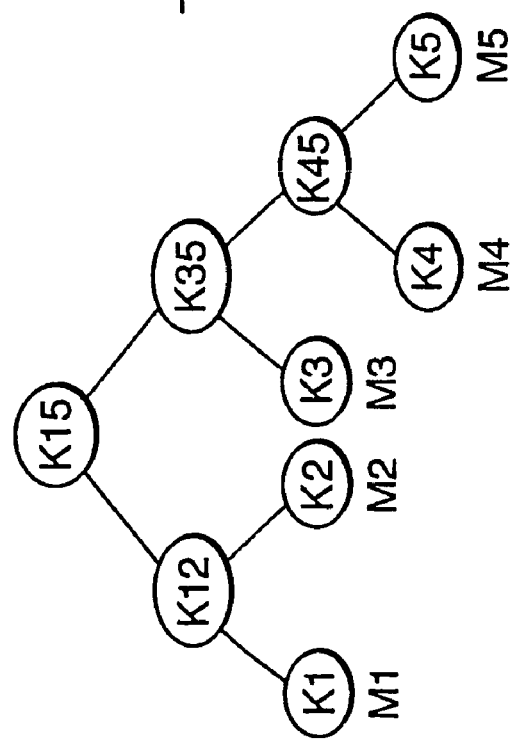
Fig. 11.

US 7,599,497 B2

1

KEY MANAGEMENT PROTOCOL

This application is the US national phase of international application PCT/GB03/01096 filed 14 Mar. 2003 which designated the U.S. and claims benefit of EP's 02252215.5 and 02252217.1, both dated Mar. 27, 2002, the entire content of which is hereby incorporated by reference.

BACKGROUND

1. Technical Field

The present invention relates to the distribution and management of session keys in a communications network, for example, an internet broadcast application.

2. Related Art

Recent interest in group communications with a very large set of receivers has led to a need for secure communications systems that scale efficiently as the number of users increases. For example, developers of Internet broadcast applications such as teleconferencing and video-on-demand desire more effective secure communication between very large numbers of users.

In group communications, special problems arise in a dynamic group in which new members can join the group and current members can leave the group, either voluntarily or by being ejected. There are at least three security issues that to be considered:

1. Group key security (a group key being a key which allows access to information by all the members of the group). It should be computationally infeasible for a person outside the group to discover the group key.

2. Forward Security. A system has forward security if a member leaving the group cannot get access to later group keys and so cannot decrypt data sent after that user has left the group.

3. Backward Security. A system has backward security if a member joining the group cannot get access to earlier group keys and so cannot decrypt data sent before that user joined the group.

A simple multi-user system provides a key distribution centre (or key server) that is in direct contact with every member of the group. Each member shares a key with the key distribution centre (the member's individual key) and, for group communications, all members share a group key. Each time a member joins or leaves the group, the group key must be updated to ensure backward or forward security as the case may be. When a new member joins the group, the new group key is sent to the new member, encrypted using the new member's individual key and is sent, as a broadcast, to all existing members, encrypted using the previous group key. Thus a join event is relatively straightforward and scales well in terms of computational effort, broadcast bandwidth requirements and secure unicast requirements as the number of users increases.

When a member leaves the group, the new group key must be individually sent to members using that member's individual key since, if the new group key was encrypted using the previous group key, the user that has just left the group would be able to generate that new group key (it being assumed that that user would receive the encrypted new key by permitted means or otherwise).

It can be seen that, the computational and communication requirements scale in a linear manner with the number of users. Thus, in a system with a very large number of users, the computational and communication requirements when a member leaves the group can become prohibitive.

2

It can be seen that there is a need to provide a key management system that scales effectively as the number of users increases. In particular, there is a need for a key management system in which the computational time of the server and the users, the memory storage requirements of the users and the broadcast bandwidth requirements all scale effectively as the number of users increases.

A hierarchical key tree is disclosed in "Key Management for Multicast: Issues and Architectures" by D Wallner et. al. (National Security Agency, June 1999, www.ietf.org/rfc/rfc2627.txt).

A hierarchical binary tree is an efficient tree-based key management technique. A hierarchical binary tree works as follows. A multicast group has N members ($M_1$ to $M_N$). A new member joins the group by contacting the controller via a secure unicast channel. At the time the new member joins, the new member and the controller negotiate a pairwise secret key.

The controller stores a binary tree structure in which each node contains a key. At the leaves of the tree there are the N secret keys that the controller has negotiated with each of the members of the group. Each member stores a subset of the controller's keys. The subset of keys stored by a member is the set of keys in the path from the leaf to the root of the tree including the leaf and the root itself. The root node represents the key used to encrypt data during the group communication; all other keys in the tree are auxiliary keys used only to facilitate efficient key updates.

FIG. 1 shows a hierarchical tree for a system having three users, M1, M2 and M3. The tree has a root node K14 connected to two nodes K12 and K34. K12 in turn is connected to nodes K1 and K2. Node K34 is connected to node K3. The users M1, M2 and M3 are associated with nodes K1, K2 and K3 respectively. Each of the nodes K1, K2, K3, K12, K34 and K14 represents a cryptographic key.

In a hierarchical tree structure, each member of the group knows all the keys from its leaf node up to the root node. Thus, user M1 knows the keys for nodes K1, K12 and K14. User M2 knows the keys for nodes K2, K12 and K14. User M3 knows the keys for nodes K3, K34 and K14.

Thus, every user knows the key at the root node K14. Accordingly, the root key can be used to encrypt all transmissions involving users M1, M2 and M3.

If a new user M4 joins the group, that user must be added to the hierarchical tree. FIG. 2 shows the same hierarchical tree as FIG. 1, except that nodes K14 and K34 have been replaced with nodes K14' and K34' and the new user M4 is attached via new node K4 to node K34'. The keys K14' and K34' are different from the previous keys K14 and K34 to ensure that the system has backward security. This is implemented by the key server at the root node. Key 4 is generated by the key server and keys K34 and K14 are updated (to K34' and K14' respectively) by the key server.

The new user M4 needs to know the keys K4, K34' and K14'. This information is transmitted to M4 via a secure channel.

The key server informs the other members of the group of the new keys by sending encrypted broadcasts that all members can receive (non-members will be able to receive the broadcast but they will not be able to decrypt the information sent). The following broadcasts are made: K34' encrypted with K3, K14' encrypted with K34' and K14' encrypted with K12.

User M3 knows the key K3 and can therefore decrypt K34' encrypted with K3 to arrive at K34'. From this, user M3 can decrypt K14' encrypted with K34'. Similarly, users M1 and M2 both know key K12 and can therefore decrypt K14' encrypted with K12. Thus all users once again know all of the keys from their leaf of the tree to the root. Transmissions involving the members of the group (now including the new member M4) can be encrypted with the new root key K14'.

If user M3 leaves the group, that user must be removed from the hierarchical tree. FIG. 3 shows the hierarchical tree of FIG. 2, except that user M3 and node K3 have been removed from the tree, and nodes K14' and K34' have been updated to K14" and K34" respectively. Thus all of the keys that were known to M3 (K3, K34' and K14') have been either removed or updated. Thus the system has forward security.

The key server updates keys K14' and K34' to generate keys K14" and K34" respectively. The key server then broadcasts K34" encrypted with K4 and K14" encrypted with K34". The user M4 knows key K4 and so can decrypt K34" encrypted with K4 to arrive at K34". Similarly, M4 can decrypt K14" encrypted with K34" to arrive at the new root key K14". As before, K14" must also be broadcast encrypted with K12 so that users M1 and M2 can obtain the new root key. Since previous user M3 did not know either key K4 or key K12, he cannot obtain key K14" from the broadcast messages.

The principal advantage associated with the use of a tree for the organisation of users in a multi-user system is that any individual user only knows a subset of the keys of the system. Thus, when a user leaves the group, only that subset needs to updated to ensure backward security. When a user leaves the group, the number of keys that have to be updated is of the order of log(N), where N is the number of users. Thus, the number of transmissions required to re-key the tree scales as the number of users increases.

It is not essential that a hierarchical tree is a binary tree. A P-ary tree can be used. As the value P rises, the storage requirement for each user decreases, but at the expense of an increase in the number of transmissions required from the key server.

A variant of the hierarchical tree described above is the one-way function tree described in "Key Management for Large Dynamic Groups: One-Way Function Trees and Amortized Initialization" by D Baleson et. al. (TIS Labs at Network Associates, 26 Feb. 1999).

The one-way function tree described by Baleson et. al. is a binary tree. Each node of the tree is associated with two keys: an unblinded key K(x) and a blinded key K'(x). The session key that is used to encrypt application data (such as a video broadcast) includes both the blinded and unblinded keys of the root node. The blinded key K'(x) is derived from the unblinded key K(x) using a one-way function (see below). K'(x) is 'blinded' in the sense that it is computationally infeasible to find K(x) from K'(x).

Each node in the hierarchical tree (except the leaf nodes) has two children: x_left and x_right. The parent node K(x) is defined by the following formula:

$$K(x)=K'(x\_left) \text{ XOR } K'(x\_right)$$

The members of the system are associated with the leaves of the tree. Each member knows the blinded keys for every node that is a sibling of any of the nodes on the branch of the tree extending from the user to the root of the tree.

Taking the binary tree of FIG. 1 as an example, the user M1 would know the blinded and unblinded keys for node K1 (K1 and K'1) and would know the blinded keys for nodes K2 (the sibling of K1) and K34 (the sibling of K12) (the keys K'2 and K'34 respectively). From this information, the user M1 can generate the unblinded key for K12 from the blinded keys K'1 and K'2 thus:

$$K12=K'1 \text{ XOR } K'2$$

Using a one-way function generates the blinded key K'12 of node K12 (K'12) with the result that the twin keys (blinded and unblinded) of K12 (K12 and K'12 respectively) are generated. Further, user M1 can generate the unblinded key of node K14 from the blinded keys K'12 and K'34 thus:

$$K14=K'12 \text{ XOR } K'34$$

Using a one-way function generates the blinded key of K14 (K'14) so that the twin keys of the root node K14 (K14 and K'14) are known.

The purpose of the blinded and unblinded keys is the reduction of the number of keys that a key distribution server has to send during key update operations. The key distribution server must send $\log_2(N)$ updates in the form blinded keys (where N is the number of users). The updates are encrypted to ensure that only the members who should receive the updates have the necessary keys to decrypt the messages and receive the updates.

One-way functions such as that used in the one-way function tree described above are mathematical functions that are relatively easy to compute in a first direction but is computationally infeasible to compute in the other (reverse) direction.

Message digest, fingerprint or compression functions are examples of a first class of one-way functions (functions of this class are commonly called "hash functions"). A message digest function is a mathematical function that takes a variable length input string and converts it into a fixed-length binary sequence. Modern message digest functions typically produce hash values of 128 bits or longer.

Message digest functions are used to create a digital signature for a document. Since it is computationally infeasible to deliberately produce a document that will hash to a particular hash value and extremely unlikely to find two documents that hash to the same value, a document's hash value can serve as a cryptographic equivalent of the document.

Examples of message digest functions are MD4 (Message Digest 4), MD5 (Message Digest 5, see "The MD5 Message-Digest Algorithm" by R. Rivest, MIT Laboratory for Computer Science and RSA Data Security, Inc., April 1992, www.ietf.org/rfc/rfc1321.txt) and SHA (Secure Hash Algorithm). SHA is generally considered to be the most secure of the three.

One-way functions can also be generated using pseudo random function (PRF) with varying input and output lengths. A suitable known PRF is an encryption algorithm called RC5. The RC5 encryption algorithm is a fast symmetric cipher algorithm suitable for hardware or software implementation and has low memory and computational requirements.

Another example of a one-way function is a trapdoor one-way function. The inverse of a trapdoor one-way function is easily generated if the trapdoor is known but difficult otherwise.

A public-key cryptosystem can be designed using a trapdoor one-way function. Public-key cryptosystems are well known in the art (see Digital Communications Fundamentals and Applications, Bernard Sklar, Prentice-Hall International, Inc., 1998 edition, pages 698 to 702). The public key in such a system gives information about the particular instance of the function; a private key gives information about the trapdoor. The function can be computed in the forward direction only unless the trapdoor is known. The forward direction is used for encryption and signature verification. The reverse direction is used for decryption and signature generation.

The prior art has addressed some of the problems associated with the distribution and management of session keys in a communications network. In particular, the use of hierarchical trees provides systems in which bandwidth usage and key storage by the key distribution server scales logarithmically as the number of users increases.

There are problems with the prior art systems. For example, the algorithms described all require the update information to be encrypted in such a manner that only members entitled to the update information have the necessary keys to decrypt that information.

BRIEF SUMMARY

According to exemplary embodiments of the present invention there is provided a method of managing keys in a key distribution system for a communications group, the key distribution system maintaining a tree of nodes including at least one leaf node that has a parent node, each node of the group being associated with a first key, the method comprising:
  the system updating the first keys of a first branch of nodes in the tree by allocating new first keys to each of the nodes in the branch.
  the system determining an offset for generating the updated first key of each node in the branch from the previous node in the branch; and
  broadcasting each of said offsets so that, given the updated first key associated with the first node of said branch, each updated first key of said branch of nodes can be calculated.

Preferably, the first key of each parent node in said tree of nodes is generated from the first key of each of its child nodes by two one-way functions and a mixing function, the mixing function including the offset as a parameter.

The present exemplary embodiment of this invention further provides a key distribution system for a communications group, the key distribution system maintaining a tree of nodes including at least one leaf node that has a parent node, each node being associated with a first key, wherein: the first key of each parent node in the tree is derived from the first key of each of its child node by two one-way functions and a mixing function, the mixing function including an offset value as a parameter.

The present exemplary embodiment of this invention also provides a key distribution system for a communications group, the key distribution system comprising an encryption key and maintaining a tree of nodes including a root node that has at least one child node, and at least one leaf node that has a parent node, the communication group comprising at least one member, wherein the encryption key comprises a join field and a leave field, and wherein:
  each member of the group knows the join field of the encryption key;
  each node of the key distribution system is associated with a leave key;
  the leave field of the encryption key is derived from the leave key of the root node.

Further preferred features of the invention are set out in the appended claims.

From the description of the below it will become apparent that the one-way functions provide the security for the key distribution, while the offset message mechanism make the distribution more efficient.

BRIEF DESCRIPTION OF THE DRAWINGS

A protocol for the distribution and management of session keys in a communications network will now be described by way of example with reference to the accompanying drawings, in which
FIG. 11 demonstrates the removal of a member from the hierarchical tree structure of FIG. 9.

DETAILED DESCRIPTION OF EXEMPLARY EMBODIMENTS

Figure 4:
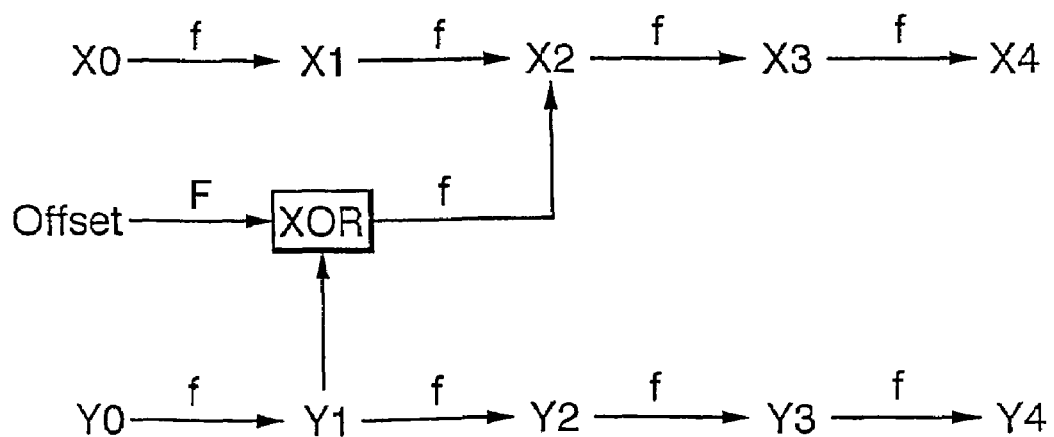
FIG. 4 demonstrates the generation of related chains of one-way functions.

The preferred embodiment of the present invention uses what will be called an offset hierarchy binary tree (OHBT). The OHBT system uses offset messages to implement the key update and key recovery mechanisms. The offset message can be considered to be the distance between two chains of one-way functions. FIG. 4 shows a first chain having keys X0, X1, X2, X3 and X4. X1 is generated from X0 using a one-way function f, X2 is generated from X1 using one-way function f, X3 is generated from X2 using one-way function f and X4 is generated from X3 using one-way function f. FIG. 4 also shows a second chain having keys Y0, Y1, Y2, Y3 and Y4. In a similar manner to the first chain, the keys Y0 to Y4 are each separated by one-way function f.

X0 and Y0 are unrelated different keys. However, it is possible to move from one chain to the other using a straightforward formula. The inventor has noticed that, given Y1, X2 can be generated using the following formula:

$$X2 = f(Y1 \text{ XOR Offset})$$

where $$\text{Offset} = X1 \text{ XOR } Y1$$

Since $$f(Y1 \text{ XOR Offset}) = f[Y1 \text{ XOR } (X1 \text{ XOR } Y1)]$$
$$= f[Y1 \text{ XOR } (Y1 \text{ XOR } X1)]$$
$$= f[(Y1 \text{ XOR } Y1) \text{ XOR } X1]$$
$$= f(0 \text{ XOR } X1)$$
$$= f(X1)$$
$$= X2$$

In this manner, the user knowing the root key Y0 of chain Y can, given the correct offset message, recover X2 and, from X2, he can recover the later keys in the X chain.

There is a lack of security in the offset system described above in that, from Y1 and the offset to generate X2 the user can also generate X1, since that offset is simply X1 XOR Y1.

If the chains X and Y are keys in a cryptosystem, then this lack of security is not acceptable since, in order to calculate key X2, the user knowing chain Y can generate a key, X1, that he should not be given access to, thereby disclosing a key that should be confidential.

Figure 5:
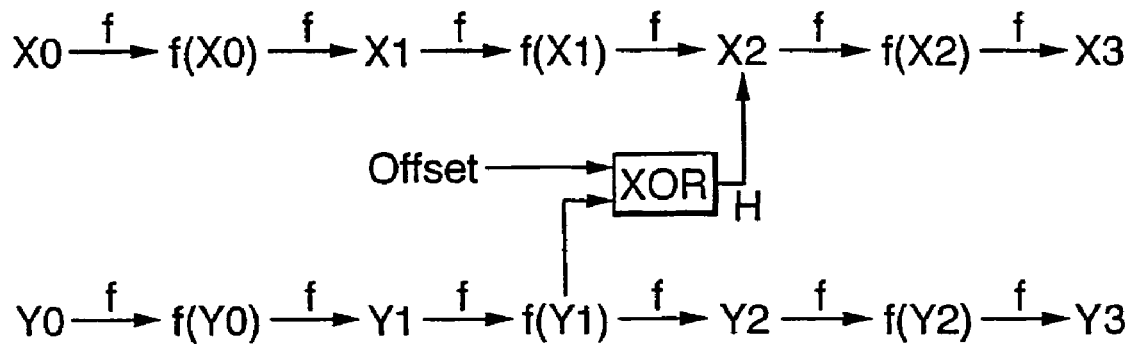
FIG. 5 demonstrates the generation of related chains of double one-way functions.

A solution to the lack of security described above is to generate intermediate keys. FIG. 5 shows a first chain having keys X0, X1, X2 and X3 and intermediate keys f(X0), f(X1) and f(X2). f(X0) is generated from X0 using a one-way function, X1 is generated from f(X0) using one-way function f, f(X1) is generated from X1 using one-way function f, X2 is generated from f(X1) using one-way function v, f(X2) is generated from X2 using one-way function f and X3 is generated from f(X2) using one-way function f. FIG. 5 also shows a second chain having keys Y0, Y1, Y2 and Y3 and intermediate keys f(Y0), f(Y1) and f(Y2). In a similar manner to the first chain, Y0, f(Y0), Y1, f(Y1), Y2 and f(Y2) are each separated by a one-way function f.

A user knowing Y0 can generate the key X2 using the following formula:

$$X2 = f[f(Y1) \text{ XOR Offset}]$$

where $$\text{Offset} = f(X1) \text{ XOR } f(Y1), \text{ and}$$

$$Y(1) = f[f(Y0)]$$

Accordingly, the user can generate X2 and the later keys in that chain but cannot generate X1. Only the intermediate key H(X1) can be generated and that intermediate key is only used temporarily in generating the key X2. It is, of course, computationally infeasible to generate X1 from H(X1).

Figure 6:
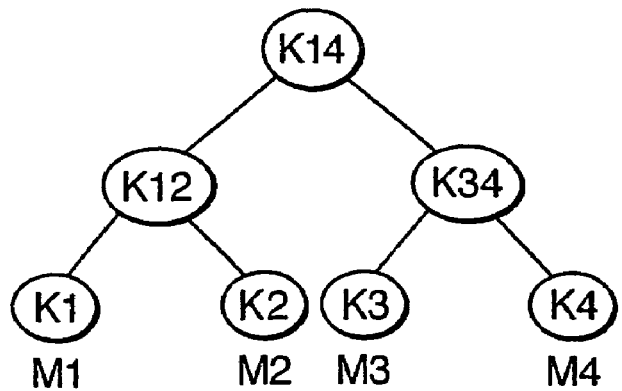
FIG. 6 shows a hierarchical tree used in the present invention.

A preferred embodiment of the present invention is for use by a multicast group having N members, $M_1$ to $M_N$ and having a group controller (preferably centralised) called the key distribution server. The group of users are organised in a tree structure as shown in FIG. 6. In FIG. 6, the users are organised in a hierarchical binary tree having a root node K14 (the key distribution server). Root node K14 has two children, nodes K12 and K34. Node K12 in turn has two children, K1 and K2: node K34 has two children, K3 and K4. The users are associated with the leaves of the tree. In the example of FIG. 6, four users $M_1$ to $M_4$ are associated with nodes K1 to K4 respectively.

The system transfers application data in a secure manner by encrypting data using a session key. The session key comprises two components: a join field and a leave field. The join field value is common to all members. Each node of the tree is however allocated a different value for its leave field.

The leave field for each node is calculated by the users in a bottom-up approach i.e. given the leave field of a node (the "child_key"), a user can generate the leave field of the parent of that node in the tree (the "parent_key"). The calculation of the leave field of a parent node is achieved using the formula:

$$\text{Parent\_key} = f(f(\text{child\_key, seq\_}n, \text{pos\#\_key}) \text{ XOR Offset}).$$

wherein:

(a, b, c) represents a appended by b appended by c.

f represents some particular one-way function.

seq_n is a sequence number. It is increased each time the user has to generate the leave key (see below).

pos#key is the position in the tree of the key that is generated, e,g, node K34 has position 34.

Offset is an offset message, as described above.

In a preferred embodiment of the invention, the formula $$\text{Parent\_key} = f(f(\text{child\_key, seq\_}n, \text{pos\#\_key}) \text{ XOR Offset})$$

is implemented as:

$$\text{Parent\_key} = f(A \text{ XOR offset})$$

where $$A = f[\text{child\_key XOR opad}, H(\text{child\_key, seq\_}n, \text{pos\#\_key})]$$

and ipad=the byte 0x36 repeated B times opad=the byte 0x5C repeated B times (Ox represents a hexadecimal number)

Given the leave field of K1, user M1 can generate the leave field of K12 and, from the leave field of K12, the user M1 can generate the leave field of K14 as follows:

$$K12 = f(f(K1, \text{seq\_}n, 12) \text{ XOR Offset\_1})$$

$$K14 = f(f(K12, \text{seq\_}n, 14) \text{ XOR Offset\_12})$$

Similarly, given K2, K3 and K4, the following leave fields can be calculated by the users M2, M3 and M4 respectively:

$$K12 = f(f(K2, \text{seq\_}n, 12) \text{ XOR Offset\_2})$$

$$K14 = f(f(K12, \text{seq\_}n, 14) \text{ XOR Offset\_12})$$

$$K34 = f(f(K3, \text{seq\_}n, 34) \text{ XOR Offset\_3})$$

$$K14 = f(f(K34, \text{seq\_}n, 14) \text{ XOR Offset\_34})$$

$$K34 = f(f(K4, \text{seq\_}n, 34) \text{ XOR Offset\_4})$$

$$K14 = f(f(K34, \text{seq\_}n, 14) \text{ XOR Offset\_34})$$

Figure 7:
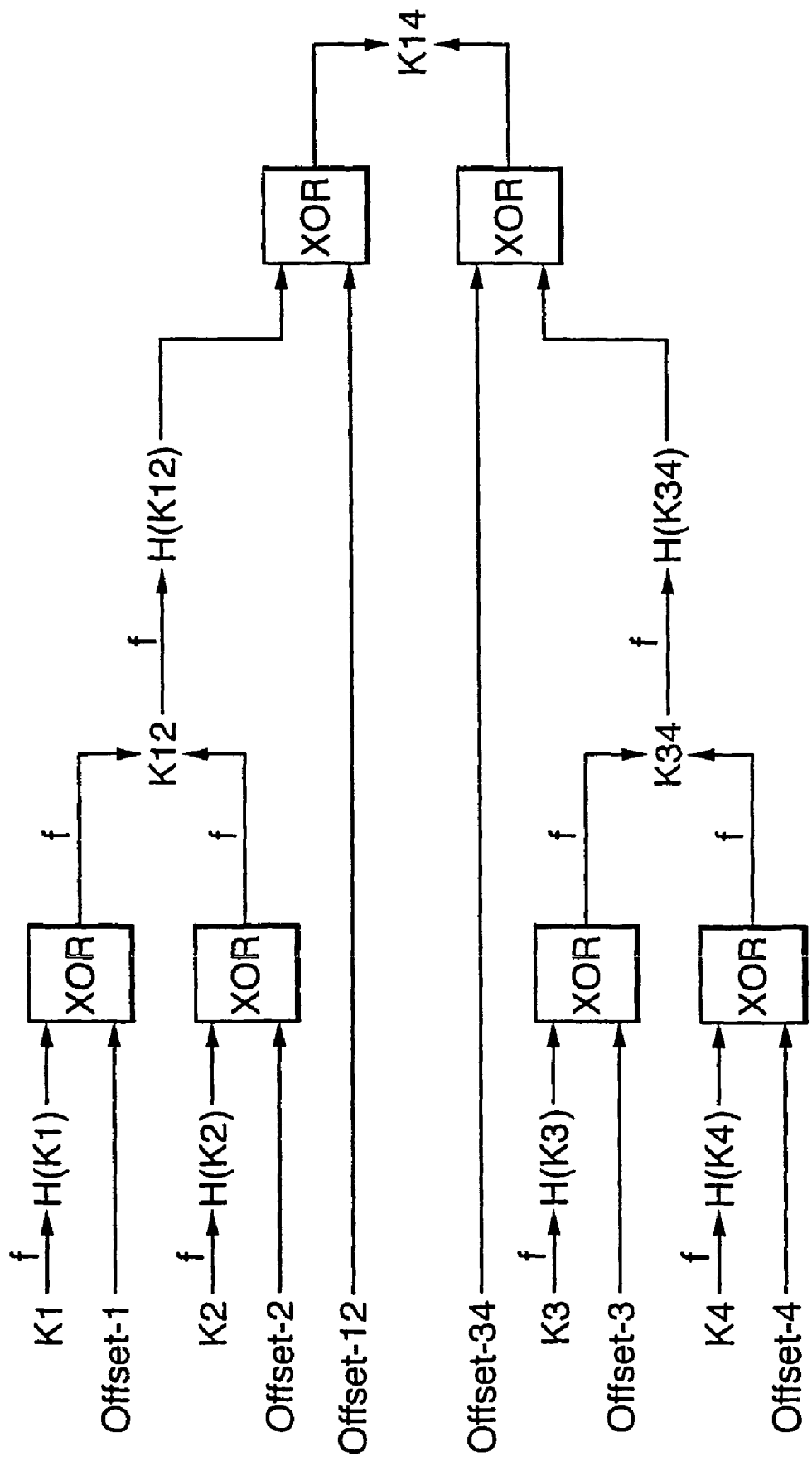
FIG. 7 demonstrates the generation of keys in related chains of one-way functions in accordance with the present invention.

The generation of the keys K12, K34 and K14 from K1, K2, K3 and K4, including the generation of the intermediate keys is shown in FIG. 7. It can be seen that the leave field values are generated using a double one-way function arrangement similar to that described with reference to FIG. 5.

The leave field K1 is operated on by a one-way function f to obtain f(K1) and then mixed, using an XOR function, with an offset value, offset_1, to obtain the leave field K12, that can be considered to be part of a different chain of one-way functions. Thus, nodes K1 and K12 of the tree can be considered to be part of two different chains of one-way functions in the same way as nodes Y1 and X2 in FIG. 5 are part of different chains of one-way functions. Another similarity between the chain of one-way functions in FIGS. 5 and 7 is of course that moving from Y1 to X2 in FIG. 5 is done via an intermediate key f(Y1) and moving from node K1 to node K12 in FIG. 7 is done via an intermediate key f(K1).

In FIG. 7, the leave field K2 is operated on by a one-way function f to obtain f(K2) and then mixed, using an XOR function, with an offset value, offset_2, to obtain the leave field K12, that can be considered to be part of a different chain of one-way functions. The leave field K12 calculated is, of course, the same as the leave field K12 referred to above.

In a similar manner, FIG. 7 shows the generation of leave field K34 from leave field K3 via an intermediate key f(K3)

and a mixing function and from leave field K4 via an intermediate key f(K4) and a mixing function.

The leave fields K12 and K34 are operated on by a one-way function f to obtain intermediate keys f(K12) and f(K34) respectively. Those intermediate keys are mixed, using an XOR function, with offset values offset_12 and offset_34 respectively, to obtain the leave field K14.

In order to initialise the hierarchical tree of FIG. 6, the key distribution server shares a different secret key with each user of the system. This may be achieved by the key server distributing a certificate containing its public key. A user that wants to be part of the group then sends to the key server a random key (the secret key that will be shared between the user and the key distribution server) that is encrypted using the public key. The key server decrypts the encrypted message to regenerate the random key.

Refer to FIG. 6. Assume that the user M1 shares a secret key K_m1 with the key distribution server. The user M1 is assigned to the node K1 that has a leave field K1 assigned by the key distribution server that is, at this point, unknown to the user M1. As described above, the leave field for a parent node can be calculated using the following formula:

Parent_key=$f$($f$(child_key, seq_$n$, pos#_key) XOR offset)

The same algorithm can be used to generate the leave field of the node K1 from the secret key K_m1 thus:

K1=$f$[$f$(K_m1, 1, 1) XOR offset_$m$1]

Thus the key distribution server simply calculates the offset required to obtain K1 from the key K_m1 and broadcasts that offset to the group. Of course, only user $M_1$ can use that offset to generate the leave field K1 because only user $M_1$ knows the key K_m1.

The key server calculates the offset messages required by the user $M_1$ in order to generate, from the random key K_m1, the leave field for each node in the hierarchical tree from the user's leaf node to the root of the tree i.e. the leave fields K1, K12 and K14 as follows:

K1=$f$[$f$(K_m1, 1, 1) XOR offset_$m$1]

K12=$f$[$f$(K1, 1, 12) XOR offset_1]

K14=$f$[$f$(K12, 1, 14) XOR offset_12]

Once the new user has the leave key of the root node (the leave field of the session key) he can decrypt the group traffic.

Figure 8:
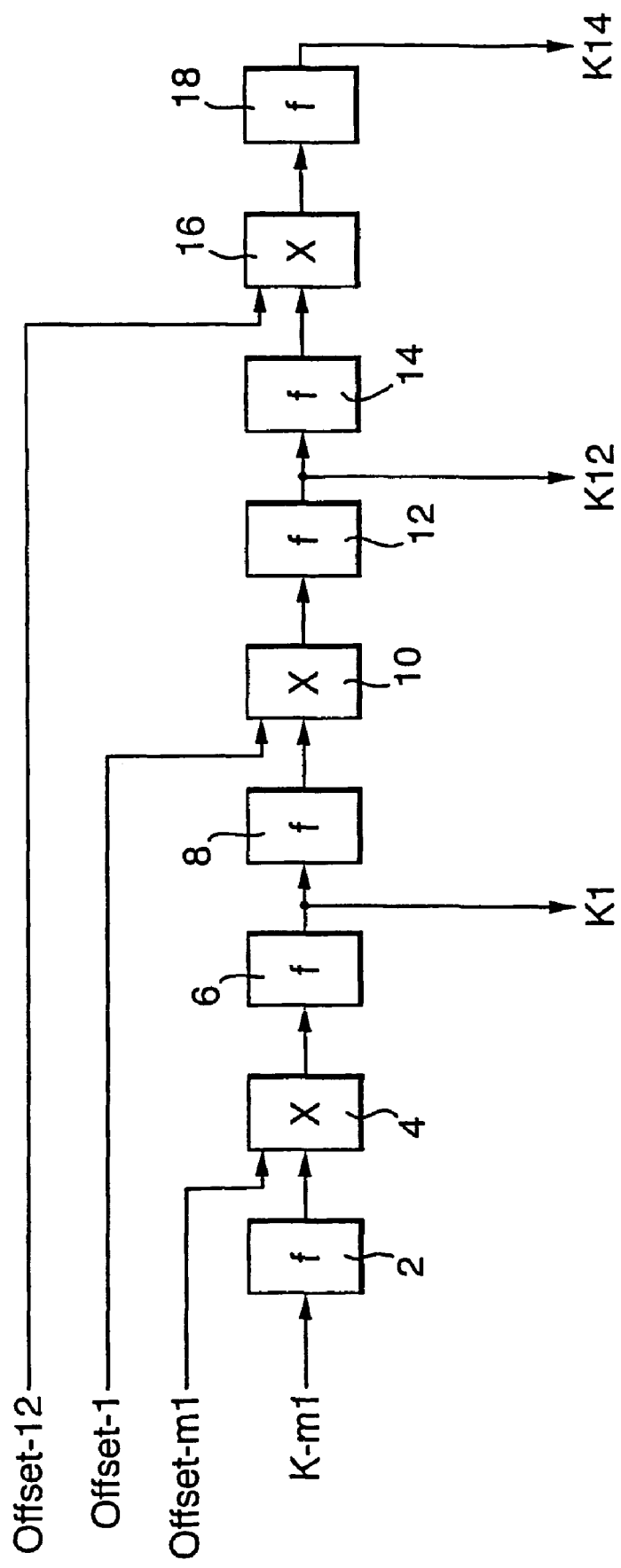
FIG. 8 demonstrates the generation of keys from offset messages, in accordance with the present invention.

The generation of keys K1, K12 and K14 by the user M1 is represented diagrammatically in FIG. 8. FIG. 8 includes elements 2, 6, 8, 12, 14 and 18 each representing a one-way function f and elements 4, 10 and 16 each representing an XOR function and includes inputs K_m1, offset_m1, offset_1, offset_12 and generates outputs K1, K12 and K14. Input K_m1 is connected to the input of one-way function 2. The output of one-way element 2 is connected to a first input to XOR element 4, the second input to XOR element 4 being connected to input offset_m1. The output of XOR element 4 is connected to the input of one-way function 6. The output of one-way function 6 provides the output K1 and is also connected to the input of one-way function 8. The output of one-way function 8 is connected to a first input of XOR element 10, the second input of XOR element 10 being connected to the input offset_1. The output of XOR element 10 is connected to the input of one-way function 12. The output of one-way function 12 provides the output K12 and is also connected to the input of one-way function 14. The output of one-way function 14 is connected to a first input of XOR element 16, the second input of XOR element 16 being connected to the input offset_12. The output of XOR element 16 is connected to the input of one-way function 18. The output of one-way function 18 provides the output K14.

In a similar manner, user $M_2$ shares a random key K_m2 with the server and receives offsets offset_m2, offset_2 and offset_12 from the key server, user $M_3$ shares a random key K_m3 with the server and receives offsets offset_m3, offset_3 and offset_34 from the key server and user $M_4$ shares a random key K_m4 with the server and receives offsets offset_m4, offset_4 and offset_34 from the key server. Users $M_2$, $M_3$ and $M_4$ then generate keys K2, K3 and K4 as follows:

K2=$f$[$f$(K_m2, 1, 2) XOR offset_$m$2]

K3=$f$[$f$(K_m3, 1, 3) XOR offset_$m$3]

K4=$f$[$f$(K_m4, 1, 4) XOR offset_$m$4]

The users $M_2$, $M_3$ and $M_4$ then generate the remaining leave keys for their branch of the tree as outlined above.

As outlined above, the join field is common to all members. The join field is modified each time that a new user joins the group. When a new user joins the group, there is no need to update any of the leave fields since the new user does not know the previous join field and therefore does not know the previous session key with which previous data was encrypted. Backward security is therefore achieved without updating the leave field of the session key (or, indeed, the leave field of any other node).

If backward security is not a requirement, then there is no need to modify the join field when a new member joins the group.

Figure 1:
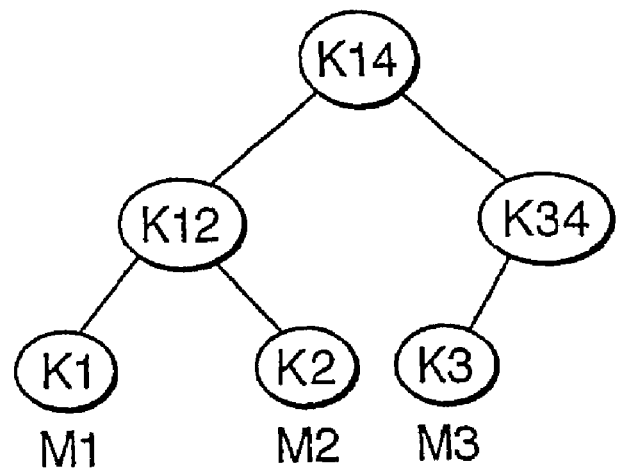
FIG. 1 shows a hierarchical tree having three users.
Figure 2:
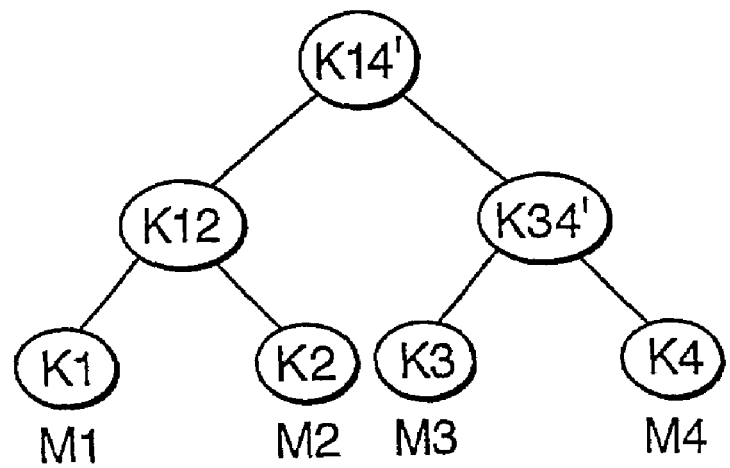
FIG. 2 shows the hierarchical tree of FIG. 1 with the addition of a fourth user.
Figure 3:
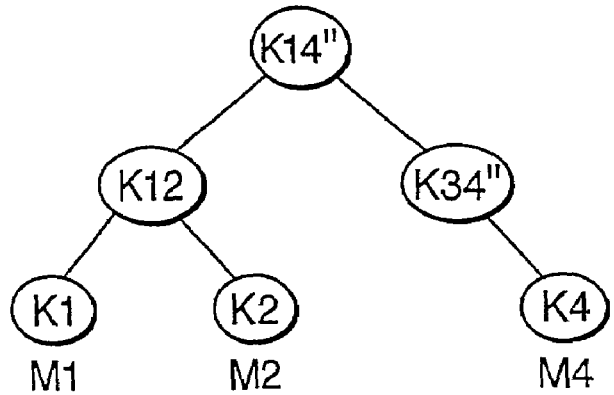
FIG. 3 shows the hierarchical tree of FIG. 2 after one of the four users has been removed.

As with the prior art hierarchical trees described above with reference to FIGS. 1 to 3, the leave field of the session key must be updated each time a user leaves the group. Indeed (given the relationship of the leave keys in the tree), every leave field that the leaving user knew must be updated to ensure that that user cannot calculate the new leave field of the session key, and therefore calculate the new session key. This is required to ensure that the system has forward security.

When a new member joins the group, the join key is updated using the following formula:

New_Join_Key=$f$(Old_Join_Key, $N$)

N is a sequence number and is typically limited in size, perhaps to four bits. The sequence number N may be broadcast to the existing users. If so, given that each of those users knows the old join key, each of those users can generate the new join key. Thus each of the existing users of the group can generate the new join key without requiring the encryption of information by the key distribution server and without requiring secure connections between the key distribution server and the users. Non-members cannot generate the new join key from the information broadcast since they do not know the old join key.

In a preferred embodiment of the invention, the new join key is generated thus:

New_Join_Key=$f$[old_key XOR opad, $f$(old_key XOR ipad, $N$)]

where ipad=the byte 0x36 repeated B times opad=the byte 0x33 5C repeated B times N may be cyclic in which case it would be possible for a user to recover and catch up having missed a join key update instruction. Thus, if the key distribution broadcasts a join event with the sequence number N=8 and a particular user had believed that the current sequence number was 6, that user can calculate the correct new join key from his current join key thus:

Join_key(N=8)=f(f(Join_key(N=6), 6), 7)

A new member of the group that is given the new join key cannot determine earlier join keys and hence cannot determine earlier session keys with which data has been transmitted (since the former sessions keys each include former join keys that are unknown to the new user). Thus the backward security of the communication system is ensured.

Similarly, whilst a former member of the group can calculate new join keys from the broadcast of sequence numbers, they do not know the new leave keys and hence cannot determine the new session keys. Thus the forward security of the communications system is ensured.

Thus, when a new member joins the group, the existing users generate the new join key themselves and the leave keys are unchanged. The new user must be sent the new join key together with all the leave keys between the leaf node of the new user and the root node in a secure manner (using a secret key shared with the key distribution server as described above). For a balanced binary hierarchical tree, each new user will be sent $\log_2(N)+1$ leave keys and 1 join key.

Figure 9:
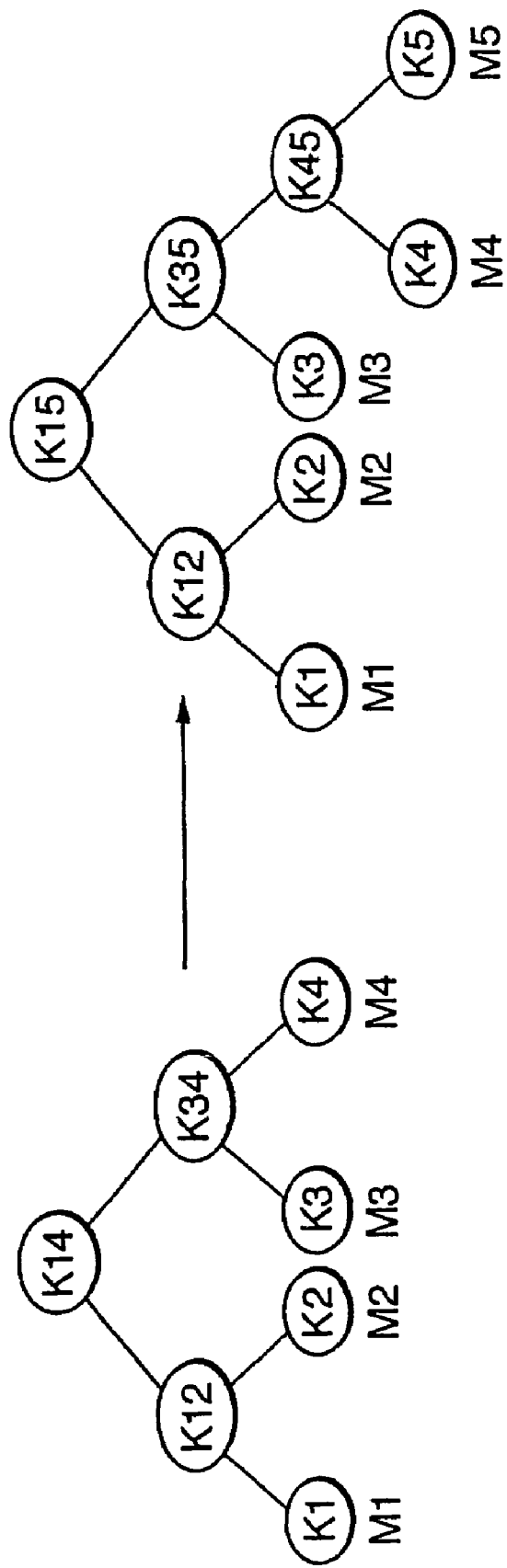
FIG. 9 demonstrates the addition of a new member into the hierarchical tree structure of FIG. 6.

FIG. 9 shows how the hierarchical tree of FIG. 6 is amended by the inclusion of a new member $M_5$. The new member $M_5$ is associated with a node K5 and is made a sibling of node K4 with which user $M_4$ is associated. A new parent node K45 is created for nodes K4 and K5. The new node K45 takes the place in the tree that was previously allocated to node K4.

Figure 10:
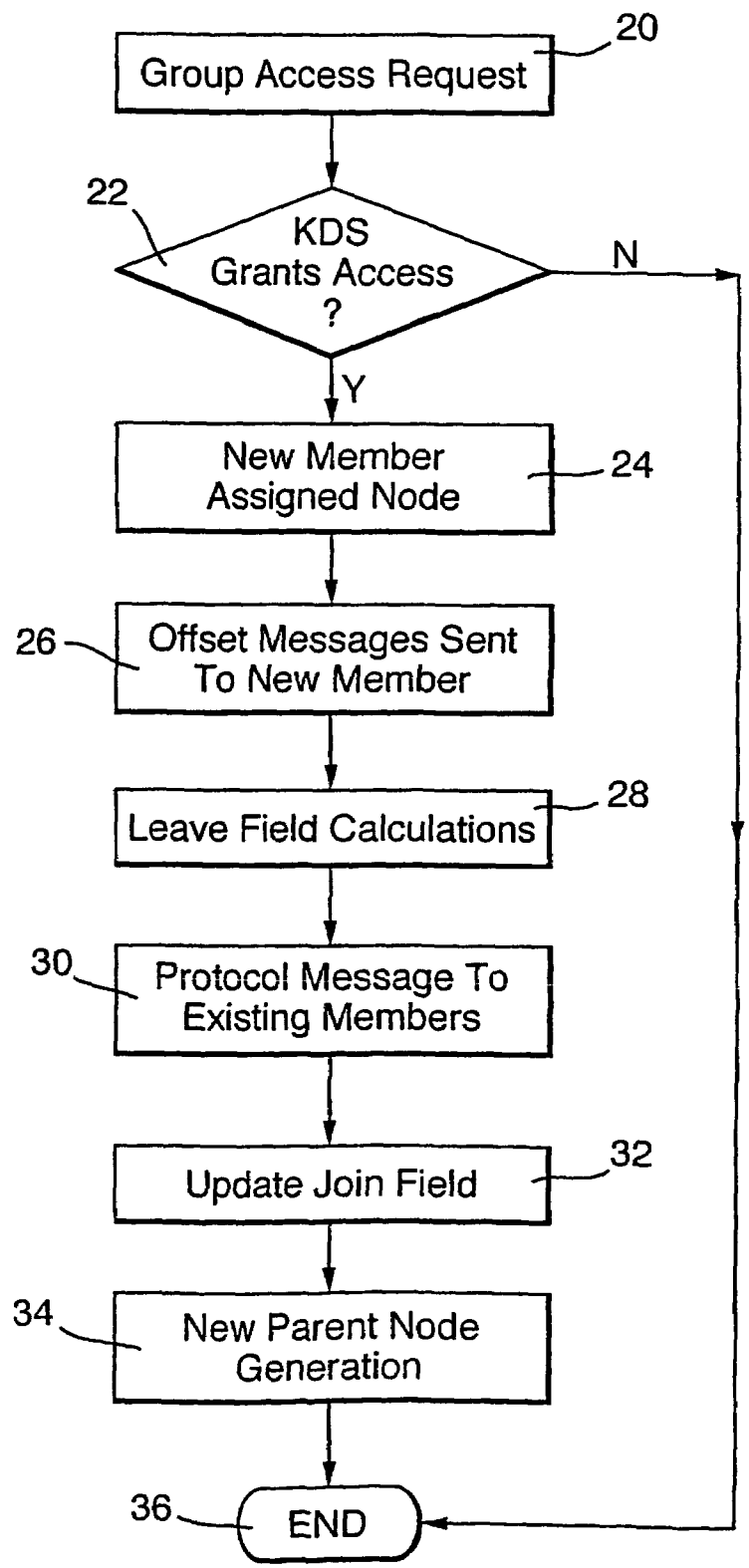
FIG. 10 is a flow chart showing the process by which a new member joins the group.

FIG. 10 lists, in the form of a flow chart, the steps required to integrate a new user is into the system. Those steps are:

1. "Group Access Request", step 20. The new member $M_5$ contacts the key distribution server to request access to the group.

2. "KDS Grants Access?", decision step 22. The key distribution server (KDS) decides whether or not the new member should be admitted to the group.

3. "New Member Assigned Node", step 24. If the key distribution server admits the new member access to the group, the key distribution server assigns a node to that user and updates its copy of the tree.

4. "Offset Messages Sent to New Member", step 26. The new member is sent all of the information that is required to gain access to the session key. This information can be send using a reliable unicast protocol. At the same time, the key server updates the join key of the group.

In the example of FIG. 9, the new member $M_5$ requires the following information: key K_m5; offset messages offset_m5, offset_45 and offset_35; and sequence numbers n_m5, n_45 and n_35.

The key K_m5 is shared between the key server and the new user $M_5$ with a secure protocol. The key could be generated by either the key server or the new user.

5. "Leave field calculations", step 28. The new user $M_5$ generates the leave keys from the leaf node K5 to the root node K15 as follows:

K5=f[f(K_m5, n_m5, 5) XOR offset_m5]

K45=f[f(K5, n_5, 45) XOR offset_5]

K35=f[f(K45, n_45, 35) XOR offset_45]

K15=f[f(K35, n_35, 15) XOR offset_35]

6. "Protocol Message to Existing Members", step 30. A protocol message is broadcast to the users in the group to inform them that another user has joined the group. The protocol message comprises a sequence number N and a position number. In this case, the position number is K5 (the position of the new member $M_5$) and K45 (the position of the nodes that needs to be added to the tree structure).

Thus the protocol Message is: "N, POS: K5, K45".

7. "Update Join Field", step 32. The existing members of the group generate the new join key in the manner described above where the new join key is given by:

f(old_join_key, N)

8. "New Parent Node Generation", step 34. Member $M_4$ (the sibling of the new member $M_5$ in the hierarchical structure) generates new node K45 that is the parent of both nodes K4 and K5. All of the information required by the member $M_4$ to realise that a new node is required and to generate that node is contained in the protocol message described in step 6 above. The leave key for the new parent node K45 is generated thus:

K45=f[f(K4, n, 45)]

The key K45 has already been calculated by the key distribution server (in the same manner) and used to generate the appropriate offset to send to the new user $M_5$ to generate the key K45.

After the new parent node has been generated, the new member join event is complete and the event terminates at "End" step 36. If the key distribution server denied the new member access to the group in the "KDS Grant Access?" decision box 22, then the join event is terminated at step 36 at this stage.

Thus the join event of the present invention is a very low cost operation in terms of the operations performed by the key distribution server, the data transmitted by the key distribution server and the computational effort required of the users.

The join event described above assumes the occurrence of a single join event. The present invention is also applicable to communication systems in which multiple simultaneous join events are allowed. The principal difference between a single join event and a multiple join event is that existing members of the system may be required to move down several layers of the hierarchical tree in which case they would have to generate several new tree nodes. The join message issued by the key distribution server for a multiple join event includes the sequence number N and the position of all the new nodes that are required to be generated.

FIG. 11 shows how the final hierarchical tree of FIG. 9 is amended by the deletion of member $M_4$. When M4 leaves the group, node K45 is deleted and node K5 is promoted in its place. Nodes K5, K35 and K15 are then re-keyed to give K5', K35' and K15'.

Figure 12:
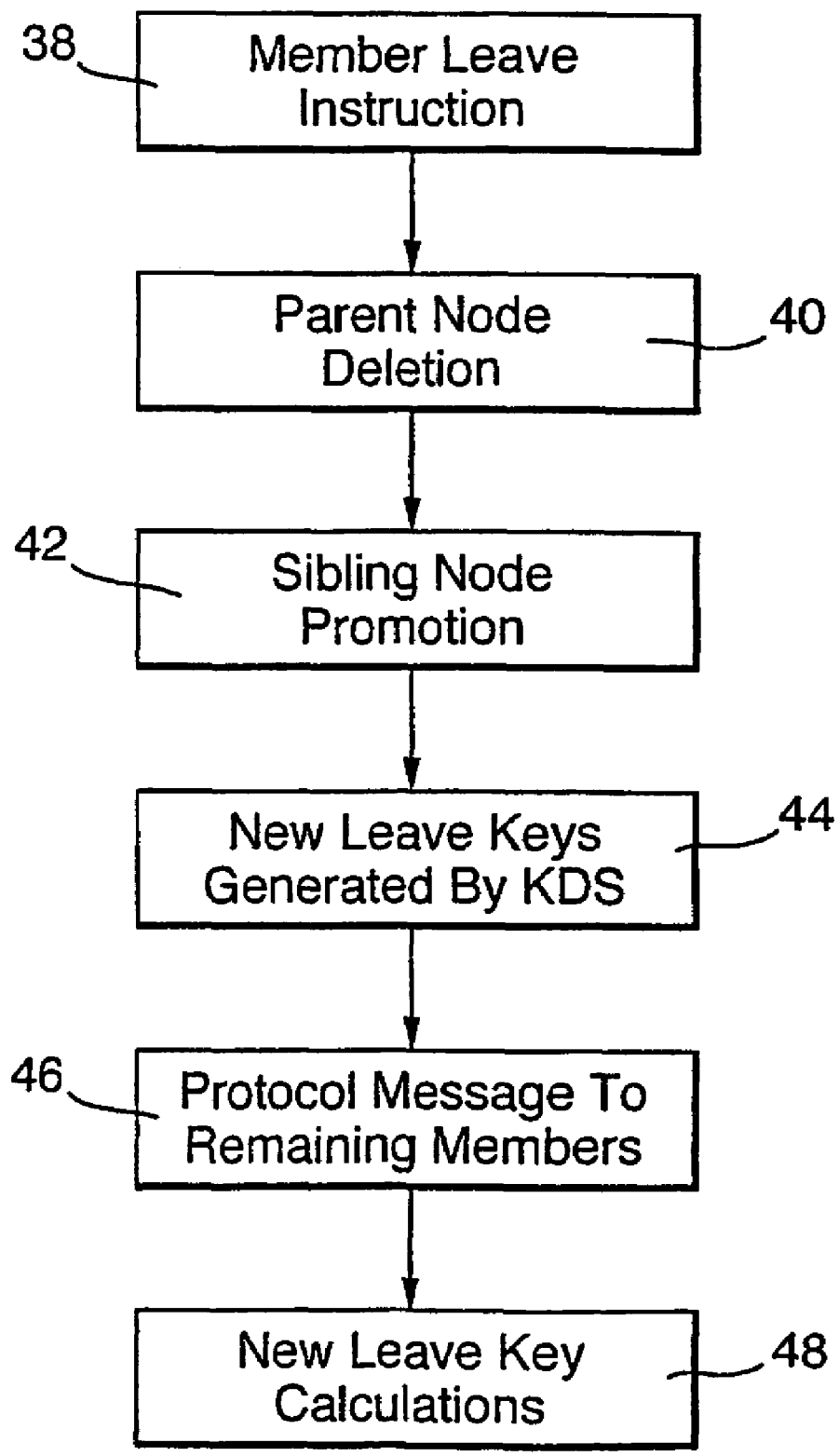
FIG. 12 is a flow chart showing the process by which a member leaves the group.

FIG. 12 lists, in the form of a flow chart, the steps required to remove a member from the system. Those steps are:

1. "Member Leave Instructions", step 38. An instruction to remove a member from the group is generated. This may take the form of a request from the user concerned (a voluntary removal) or the user in question may be ejected (a forced removal).

2. "Parent node deletion", step 40. The parent of the node associated with the member to be removed is deleted by the key distribution server from its tree.

3. "Sibling node promotion", step 42. The sibling of the node associated with the member to be removed is promoted by the server to the position in the tree stored by the server that was previously occupied by the node deleted in step 2.

4. "New Leave Keys Generated By KDS", step 44. As noted above, all of the leave keys known to the user being removed from the group should be updated to ensure the forward security of group communication. The key distribution server (KDS) generates these new keys.

5. "Protocol Message To Remaining Members", step 46. A protocol message is broadcast to all remaining users in the group. The protocol message comprises the node that is associated with the member that is leaving the group (#Position Node Leaving Tree), the parent node deleted in step 2 above (#Position Node Removed) and the offset messages required by the users to calculate the new leave fields (Offset_#Pos) where '#Pos' refers to the node to which the offset must be applied so that Offset_3 is the offset required to generate the leave key of the parent of node 3.

Thus the protocol message is: "#Position Node Leaving Tree; #Position Node Removed; Offset_#Pos".

6. "New Leave Key Calculations", step 48. The remaining members calculate the updated leave keys. The new leave key K5' is derived by both the key distribution server and user $M_5$ using a single one-way function thus:

$$K5'=f(K5, \text{Sequence number}, 5)$$

The new key K5' is used to generate the new keys K35' and K15'. The new leave keys are defined by the formulae:

$$K35'=f[f(K3, \text{sequence number}, 35) \text{ XOR Offset\_3}]$$

$$K15'=f[f(K12, \text{sequence number}, 15) \text{ XOR Offset\_12}]$$

$$K15'=f[f(K35', \text{sequence number}, 15) \text{ XOR Offset\_35'}]$$

where:

$$\text{Offset\_3}=f(K3, \text{sequence number}, 35) \text{ XOR } f(K5', \text{sequence number}, 3)$$

$$\text{Offset\_35'}=f(K35', \text{sequence number}, 15) \text{ XOR } f(K12, \text{sequence number}, 15)$$

$$\text{Offset\_12}=f(K12, \text{sequence number}, 15) \text{ XOR } f(K35', \text{sequence number}, 15).$$

It is possible that a user may miss a protocol message. In such circumstances, that user will not have updated the tree (or that branch portion that the user keeps) and accordingly will not know the new session key. The user will not then be able to decrypt the information transferred by the system.

To deal with such circumstances, the key distribution server may provide hint messages to enable users rekey the tree in the event that they have missed a protocol message. In one embodiment of the invention, the hint message takes the form of the protocol message that is attached a data packet. Simply attaching the previous protocol message to each data packet is feasible since each protocol message is likely to be relatively small when compared to the size of a data packet.

A user that has missed a protocol message will be able to identify this since he will not be able to decrypt the data transferred by the system. That user will simply need to extract the protocol message from the data stream.

The system could be extended to provide a number of the most recent protocol messages so that misses of several protocol messages can be caught up. The number of protocol messages that can be attached to the data messages is only limited by the amount of data bandwidth the designer of the system is willing to allocate to the hint messages.

The user of hint messages is well suited to the key distribution system of the present invention since the key update information is not encrypted, and thus can be shared across all members. There is therefore no bar to transmitted one or more hint messages with the data packets.

The leave event described above assumes the occurrence of a single leave event. The present invention is also applicable to communication systems in which multiple simultaneous leave events are allowed. The principal difference between a single leave event and a multiple leave event is that the removal of several users leaves the possibility of the remaining tree being configured in more than one possible way. Thus, in such situations the key distribution server must take decisions about the path from each remaining user to the root node and issue protocol messages accordingly.

Thus it can be seen that the OHBT protocol provides a system in which when a new user joins the group, only a sequence number N needs to be broadcast to the group (although, as discussed above, it is possible for a user to recover, even if one or more protocol messages are missed). Thus, the join event scales extremely efficiently as the number of users increases. Further, each user generates the new join key using a straightforward algorithm. Thus the computational requirements of the users for a join operation is low. A join event is secure because it is computationally infeasible for the new member to calculate the previous join key with a finite probability.

The leave operation requires the calculation and broadcast of offset messages. These messages can be broadcast as plain text messages and do not need to be encrypted. The users generate the new leave keys using a simple double one-way function. Thus, the computational requirements of the users for a leave operation is also low. A leave event is secure because although the former member knows the join key and the previous leave key for the root node, he cannot generate the new leave key of the root node and therefore cannot generate the new session key.

In general it is anticipated that the number of join events will be greater than the number of leave events for most systems. This is because there is likely to be a multiple leave event at the end of the communication session. Accordingly, the use of a low cost join event as in the present invention is an advantage.

As the number of users increases ever further, it may be advantageous to provide more than one key distribution server or to distribute the function of the key distribution server among a number of nodes. The use of multiple key distribution servers present issues of synchronisation between the servers. The present invention assists in the transfer of information between key distribution servers since key information in the present invention is transmitted as plain text messages. The lack of encryption for the transmission of key information simplifies at least some of the issues associated with the use of multiple key distribution servers.

The description of the invention given above assumes that the key nodes are arranged in a binary tree. A binary tree is not a requirement of the invention. The key nodes could be arranged in a P-ary tree (where P is greater than or equal to 2), for example.

The key distribution sever is preferably centralised at one location. Often it will be convenient for this to be at the source of application data, e.g. a video stream. Arrangements in which the functions of the key distribution server are duplicated and/or distributed over several machines at difference locations.

What is claimed is:

1. A method of managing keys in a key distribution system for a communications group, the key distribution system maintaining a tree of nodes including at least one leaf node that has a parent node, each node of the group being associated with a first key, the method comprising:
  updating the first keys of a first branch of nodes in the tree by allocating new first keys to each of the nodes in the branch;
  determining an offset representing a distance between two chains of one-way functions, for generating the updated first key of each node in the branch from a key of a previous node in the branch; and
  broadcasting each of said offsets in an unencrypted form so that, given the updated first key associated with the first node of said branch, each updated first key of said branch of nodes can be calculated.

2. A method as claimed in claim 1, wherein the first key of each parent node in said tree of nodes is generated from the first key of each of its child nodes by two one-way functions and a mixing function, the mixing function including the offset as a parameter.

3. A method as claimed in claim 2, wherein the mixing function is an XOR function.

4. A method as claimed in claim 2, wherein each parent key is generated using the formula f(f(child key) XOR OFFSET), wherein OFFSET is the offset and f represents a one-way function and wherein child_key is the first key of a child node of said parent node.

5. A method as claimed in claim 1, wherein the communication group comprises at least one member that is associated with a leaf node of the tree of nodes.

6. A method as claimed in claim 5, wherein information transferred to, from or between members of the communication group is encrypted using an application data encryption key, the encryption key comprising a join field and a leave field, wherein each member of the group knows the join field of the encryption key, and wherein the leave field of the encryption key is derived from the first key of a root node of the tree.

7. A method as claimed in claim 6, wherein the join field of the encryption key is updated each time a member joins the group.

8. A method as claimed in claim 7, wherein the new member joins the group using the following method:
  the new user requests access to the group;
  the new user is granted access to the group;
  the new member is assigned a node at a new leaf node of the communication group;
  the new member is sent all the information required to generate the first key of each node on a branch of nodes from the new leaf node to the root node; and
  the join field of the application data key is updated.

9. A method as claimed in claim 8 wherein the method further comprises:
  the generation of a new node as the parent of both the new leaf node and a pre-existing node.

10. A method as claimed in claim 7, wherein the updated join field is generated from the previous join field using a one-way function.

11. A method as claimed in claim 7, wherein a key update request is generated each time a member leaves the group, wherein the first keys of each node of the branch of nodes including both the node associated with the member that is leaving the group and the root node are the keys that are updated.

12. A method as claimed in claim 11, wherein a member leaves the group using the following method:
  an instruction to remove a member from the group is generated;
  the parent node of the node associated with the leaving member is deleted;
  the sibling node of the node associated with the leaving member is promoted to the position occupied by the deleted node;
  the first key of each node on the branch of nodes from the promoted node to the root node is updated;
  offset messages for generating the new first keys are broadcast to the group;
  remaining members of the communications group calculate the updated first key nodes of the tree.

13. A method as claimed in claim 12, wherein the instruction to remove a member from the group is generated by the member that is leaving the group.

14. A method as claimed in claim 12, wherein the instruction to remove a member from the group is generated by a key distribution server.

15. A method as claimed in claim 1, wherein the nodes are arranged in a hierarchical tree.

16. A method as claimed in claim 15, wherein the nodes are arranged in a binary tree.

17. A method as claimed in claim 1 further including:
  retransmitting messages enabling users to update keys in case the users have not received those messages.

18. A method as claimed in claim 17 wherein the retransmitted messages are attached to application data packets.

19. A method as claimed in claim 17 wherein the retransmitted messages contain a sequence number indicative of the position in the sequence of key updates.

20. A method as claimed in claim 19 wherein the sequence number is cyclic.

21. A key distribution system which, in operation, performs the method of claim 1.

22. A key distribution system for a communications group, the key distribution system comprising:
  a distribution server including
    means for maintaining a tree of nodes including at least one leaf node that has a parent node, each node being associated with a first key;
    wherein the first key of each parent node in the tree is derived from the first key of each of its child nodes by two one-way functions and a mixing function, the mixing function including an offset value representing a distance between two chains of one-way functions, as a parameter which is broadcast in an unencrypted form.

23. A key distribution system as claimed in claim 22, wherein the mixing function is an XOR function.

24. A key distribution system as claimed in claim 22, wherein each parent key is generated using the formula f(f(child key) XOR_OFFSET), wherein OFFSET is the offset and f represents a one-way function and wherein child_key is the first key of a child node of said parent node.

25. A key distribution system as claimed in claim 22, wherein_said means for maintaining comprises:
  means for updating the first keys of a first chain of nodes along a branch of the tree by allocating new first keys to each of those nodes in response to a request to update the first keys of that chain of nodes;
  means for determining an offset for generating the updated first key of each member of the chain from the previous member of the chain; and
  means for broadcasting each of said offsets so that, given the updated first key associated with the first node of said chain of nodes, each updated first key on said chain of nodes can be calculated.

26. A key distribution system as claimed in claim 22, wherein the communication group comprises at least one member that is associated with a leaf node.

27. A key distribution system as claimed in claim 22, wherein each member of the communications group includes means for encrypting and decrypting so that information transmitted to, from or between members of the communication group is encrypted using an application data encryption key, the encryption key comprising a join field and a leave field, wherein each member of the group knows the join field of the encryption key, and wherein the leave field of the encryption key is derived from the first key of a root node of the tree.

28. A key distribution system as claimed in claim 27, wherein the join field of the encryption key is updated each time a new member joins the group.

29. A key distribution system as claimed in claim 28, wherein the new member joins the group using the following method:
the new user requests access to the group;
the new user is granted access to the group;
the new member is assigned a node at a new leaf node of the communication group;
the new member is sent all the information required to generate the first key of each node on a branch of nodes from the new leaf node to the root node; and
the join field of the application data encryption key is updated.

30. A key distribution system as claimed in claim 29 wherein the said new member join method further comprises the generation of a new node as the parent of both the new leaf node and a pre-existing node.

31. A key distribution system as claimed in claim 28, wherein the updated join field is generated from the previous join field using a one-way function.

32. A key distribution system as claimed in claim 27, wherein a key update request is generated each time a member leaves the group, wherein the first keys of each node of the branch of nodes including both the node associated with the member that is leaving the group and the root node are the keys that are updated.

33. A key distribution system as claimed in claim 32, wherein a member leaves the group using the following protocol:
an instruction to remove a member from the group is generated;
the parent node of the node associated with the leaving member is deleted;
the sibling node of the node associated with the leaving member is promoted to the position occupied by the deleted node;
the first key of each node on the branch of nodes from the promoted node to the root node is updated;
offset messages for generating the new first keys are broadcast to the group;
remaining members of the communications group calculate the updated first keys of nodes of the tree.

34. A key distribution system as claimed in claim 33, wherein the instruction to remove a member from the group is generated by the member that is leaving the group.

35. A key distribution system as claimed in claim 33, except, wherein the instruction to remove a member from the group is generated by the key distribution server.

36. A key distribution system as claimed in claim 22, wherein the nodes are arranged in a hierarchical tree.

37. A key distribution system as claimed in claim 36, wherein the nodes are arranged in a binary tree.

38. A key distribution system for a communications group, the key distribution system comprising:
an encryption key distribution server including means for maintaining a tree of nodes including a root node that has at least one child node, and at least one leaf node that has a parent node,
the distribution server including means for servicing a communication group comprising at least one member client device, wherein a served encryption key defined in a server memory device comprises a join field and a leave field, and wherein:
each member client device of the group knows the join field of the encryption key;
each node of the key distribution system is associated with a leave key;
the leave field of the encryption key is derived from the leave key of the root node; and
the first key of parent nodes in the tree is generated from the first key of each of its child nodes by two one-way functions and a mixing function, the mixing function including an offset representing a distance between two chains of one-way functions, as a parameter.

39. A key distribution system as in claim 38, wherein said at least one member client device is associated with a leaf node of the tree of nodes.

40. An encryption key distribution system as in claim 38, wherein the join field of the encryption key is updated each time a member client device joins the group.

41. An encryption key distribution system as in claim 40, wherein the updated join field is generated from the previous join field using a one-way function.

42. An encryption key distribution system as in claim 39, wherein:
a key update request to the server is generated each time a member client device leaves the group, and
the leave keys of each node of the branch of nodes including both the node associated with the member client device that is leaving the group and the root node are updated.

43. An encryption key distribution system as in claim 38, wherein the mixing function is an XOR function.

44. An encryption key as in claim 38, wherein:
each parent key is generated using the formula f(f(child_key) XOR OFFSET), wherein OFFSET is the offset and f represents a one-way function and wherein child key is the first key of a child node of said parent node.

* * * * *